(12) United States Patent
Lydon et al.

(10) Patent No.: US 7,305,506 B1
(45) Date of Patent: Dec. 4, 2007

(54) METHOD AND SYSTEM FOR TRANSFERRING STATUS INFORMATION BETWEEN A MEDIA PLAYER AND AN ACCESSORY

(75) Inventors: Gregory T. Lydon, Santa Cruz, CA (US); Lawrence G. Bolton, Fremont, CA (US); Emily C. Schubert, Los Altos, CA (US); Jesse Dorogusker, Menlo Park, CA (US); Donald J. Novotney, San Jose, CA (US); John B. Filson, San Jose, CA (US); David Tupman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 11/476,262

(22) Filed: Jun. 27, 2006

Related U.S. Application Data (63) Continuation-in-part of application No. 10/833,689, filed on Apr. 27, 2004.

(51) Int. Cl.
*G06F 13/42* (2006.01)

(52) U.S. Cl. .................. 710/105; 710/300; 710/72; 710/63; 710/64

(58) Field of Classification Search ........ 710/300–315, 710/62–66, 8–13, 72, 104–105; 455/557, 455/575; 719/312, 327; 709/321, 220
See application file for complete search history.

(56) References Cited

U.S. PATENT DOCUMENTS

| | | | |
|---|---|---|---|
| 6,453,371 B1 * | 9/2002 | Hampson et al. ............. 710/37 |
| 6,725,061 B1 * | 4/2004 | Hutchison et al. ........... 455/557 |
| 6,776,660 B1 | 8/2004 | Kubota et al. | |
| 6,931,456 B2 * | 8/2005 | Payne et al. ................... 710/9 |
| 7,050,783 B2 * | 5/2006 | Curtiss et al. ............ 455/404.1 |
| 7,062,261 B2 * | 6/2006 | Goldstein et al. ........... 455/419 |
| 7,127,678 B2 * | 10/2006 | Bhesania et al. ........... 715/744 |
| 2003/0220988 A1 * | 11/2003 | Hymel ....................... 709/220 |
| 2004/0103223 A1 * | 5/2004 | Gabehart et al. .............. 710/2 |
| 2004/0224638 A1 * | 11/2004 | Fadell et al. ............... 455/66.1 |
| 2005/0014531 A1 * | 1/2005 | Findikli ..................... 455/557 |
| 2006/0184456 A1 * | 8/2006 | de Janasz ................... 705/72 |

* cited by examiner

*Primary Examiner*—Raymond N Phan
(74) *Attorney, Agent, or Firm*—Townsend and Townsend and Crew LLP (57) ABSTRACT

A method, system, and connector interface for transferring status information between a media player and an accessory. The method includes determining, by the accessory, when a button event occurs; and transmitting, by the accessory, at least one button status command to the media player, where the one or more button status commands comprise a context-specific button status command and at least one command associated with a particular media type. According to the method and system disclosed herein, the media player and accessory may utilize a plurality of commands in a variety of environment such as within a connector interface system environment to facilitate the transfer of status information.

30 Claims, 11 Drawing Sheets

| Pin | Signal Name | I/O | Function |
|---|---|---|---|
| 1 | DGND | I | Digital Ground |
| 2 | DGND | I | Digital Ground |
| 3 | TPA+ | I/O | Firewire signal |
| 4 | USB D+ | I/O | USB signal |
| 5 | TPA- | I/O | Firewire signal |
| 6 | USB D- | I/O | USB signal |
| 7 | TPB+ | I/O | Firewire signal |
| 8 | USB PWR | I | USB power in. NOT for powering; only to detect USB host |
| 9 | TPB- | I/O | Firewire signal |
| 10 | Accessory Identify | I | Pull down in dock to notify iPod of specific device |
| 11 | F/W PWR+ | I | Firewire and charger input power (8V to 30V dc) |
| 12 | F/W PWR+ | I | Firewire and charger input power (8V to 30V dc) |
| 13 | Accessory Pwr(3V3) | O | 3.3V output from iPod. Current limited to 100mA. |
| 14 | Reserved | | |
| 15 | DGND | GND | Digital Ground in iPod |
| 16 | DGND | GND | Digital Ground in iPod |
| 17 | Reserved | | |
| 18 | Dock Tx | I | Serial protocol (Data to iPod) |
| 19 | Dock Rx | O | Serial protocol (Data from iPod) |
| 20 | Accessory Detect | I/O | |
| 21 | S Video Y | O | Luminance Component |
| 22 | S Video C | O | Chrominance Component |
| 23 | Video Composite | O | Composite Signal |
| 24 | Remote Sense | I | Detect Remote |
| 25 | LINE-IN L | I | Line level input to the iPod for the left channel |
| 26 | LINE-IN R | I | Line level input to the iPod for the right channel |
| 27 | LINE-OUT L | O | Line level output to the iPod for the left channel |
| 28 | LINE-OUT R | O | Line level output to the iPod for the right channel |
| 29 | Audio Return | GND | Audio return - Signal, never to be grounded inside accessory |
| 30 | DGND | GND | Digital Ground iPod |
| 31 | Chassis | | Chassis ground for connector shell |
| 32 | Chassis | | Chassis ground for connector shell |

| Pin | Signal Name | I/O | Function |
|---|---|---|---|
| 1 | Audio Out Left / Mono Mic In | I/O | 30mW audio out left channel, also doubles as mono mic in |
| 2 | HP Detect | I | Internal Switch to detect plug insertion |
| 3 | Audio Return | GND | Audio return for left and right audio |
| 4 | Audio Out Right | O | 30mW audio out right channel |
| 5 | Composite Video | O | Video Signal |
| 6 | Accessory 3.3 V | O | 3.3V Accessory power 100mA max |
| 7 | Tx | O | Serial protocol (Data from iPod to Device) |
| 8 | Rx | I | Serial protocol (Data to iPod from Device) |
| 9 | D GND | GND | Digital ground for accessory |

METHOD AND SYSTEM FOR TRANSFERRING STATUS INFORMATION BETWEEN A MEDIA PLAYER AND AN ACCESSORY

CROSS-REFERENCE TO RELATED APPLICATIONS

This application is a Continuation-In-Part of co-pending U.S. patent application Ser. No. 10/833,689, entitled "Connector Interface System for a Multi-Communication Device", filed on Apr. 27, 2004, and assigned to the assignee of the present application.

FIELD OF THE INVENTION

The present invention relates generally to electrical devices and more particularly to electrical devices such as media players that communicate with accessory devices.

BACKGROUND OF THE INVENTION

A media player stores media assets, such as audio tracks or photos that can be played or displayed on the media player. One example of a media player is the iPod® media player, which is available from Apple Computer, Inc. of Cupertino, Calif. Often, a media player acquires its media assets from a host computer that serves to enable a user to manage media assets. As an example, the host computer can execute a media management application to manage media assets. One example of a media management application is iTunes®, version 6.0, produced by Apple Computer, Inc.

A media player typically includes one or more connectors or ports that can be used to interface to the media player. For example, the connector or port can enable the media player to couple to a host computer, be inserted into a docking system, or receive an accessory device. There are today many different types of accessory devices that can interconnect to the media player. For example, a remote control can be connected to the connector or port to allow the user to remotely control the media player. As another example, an automobile can include a connector and the media player can be inserted onto the connector such that an automobile media system can interact with the media player, thereby allowing the media content on the media player to be played within the automobile.

With the introduction of various media types (images and video), communication between a media player and an accessory may be confusing to end users. Furthermore, it may be difficult to determine, if at all, whether information has been successfully transferred between a media player and an accessory.

Thus, there is a need for improved techniques to enable manufacturers of electronic devices to exchange information.

SUMMARY OF THE INVENTION

A method, system, and connector interface for transferring status information between a media player and an accessory is disclosed. The method includes determining, by the accessory, when a button event occurs; and transmitting, by the accessory, at least one button status command to the media player, where the one or more button status commands comprise a context-specific button status command and at least one command associated with a particular media type.

According to the method and system disclosed herein, the media player and accessory may utilize a plurality of commands utilized in a variety of environments such as within a connector interface system environment to facilitate the transfer of status information.

DETAILED DESCRIPTION OF THE INVENTION

The present invention relates generally to electrical devices and more particularly to electrical devices such as media players that communicate with accessory devices. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

In a method and system in accordance with the present invention, media players and accessories are able to exchange status information using status commands. For example, in one embodiment, when the accessory determines that a button event occurs, the accessory transmits at least one button status command to the media player. The button status command includes one or more of a context-specific button status command, an image button status command, a video status button command, and an audio button status command. The media player may then transmit at least one acknowledgement status command to the accessory in response to the button status command. The media player and the accessory may utilize status commands, which may include commands associated with dedicated button status commands for different media types (e.g. image/slideshow, video, audio, etc.). The commands provide media control commands that support not only basic buttons such as play/pause, volume up, volume down, next track, and previous track but also media control commands that support context specific buttons such as next album, previous album, down arrow, etc. The media player and accessory may utilize the plurality of commands utilized in a variety of environments to facilitate the transfer of status information. One such environment is within a connector interface system environment such as described in detail hereinbelow.

Connector Interface System Overview

To describe the features of the connector interface system in accordance with the present invention in more detail, refer now to the following description in conjunction with the accompanying drawings.

Docking Connector

Figure 1A:
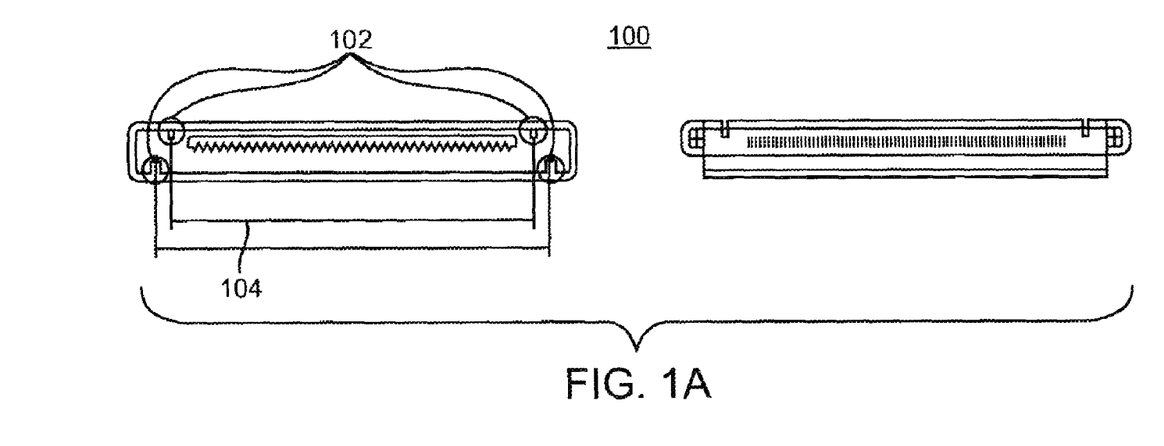
FIGS. 1A and 1B illustrate a docking connector in accordance with the present invention.
Figure 1B:
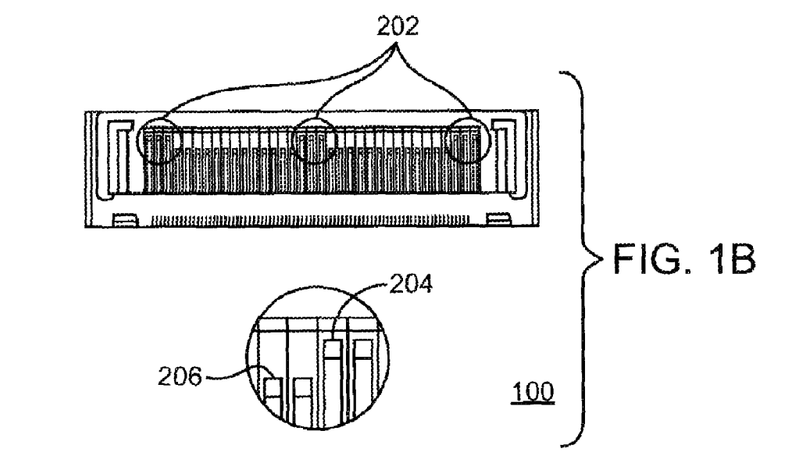

FIGS. 1A and 1B illustrate a docking connector 100 in accordance with the present invention. Referring first to FIG. 1A, the keying features 102 are of a custom length 104. In addition, a specific key arrangement is used where one set of keys is separated by one length at the bottom of the connector and another set of keys is separated by another length at the top of the connector. The use of this key arrangement prevents noncompliant connectors from being plugged in and causing potential damage to the device. The connector for power utilizes a Firewire specification for power. The connector includes a first make/last break contact to implement this scheme. FIG. 1B illustrates the first make/last break contact 202 and also illustrates a ground pin and a power pin related to providing an appropriate first make/last break contact. In this example, the ground pin 204 is longer than the power pin 206. Therefore, the ground pin 204 would contact its mating pin in the docking accessory before the power pin 206, minimizing internal electrical damage to the electronics of the device.

In addition, a connector interface system in accordance with the present invention uses both USB and Firewire interfaces as part of the same docking connector alignment, thereby making the design more compatible with different types of interfaces, as will be discussed in detail hereinafter. In so doing, more remote accessories can interface with the media player.

Remote Connector

Figure 2A:
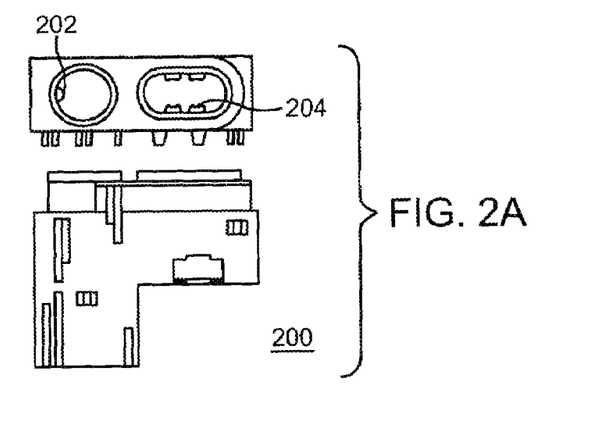
FIG. 2A is a front and top view of a remote connector in accordance with the present invention.
Figure 2B:
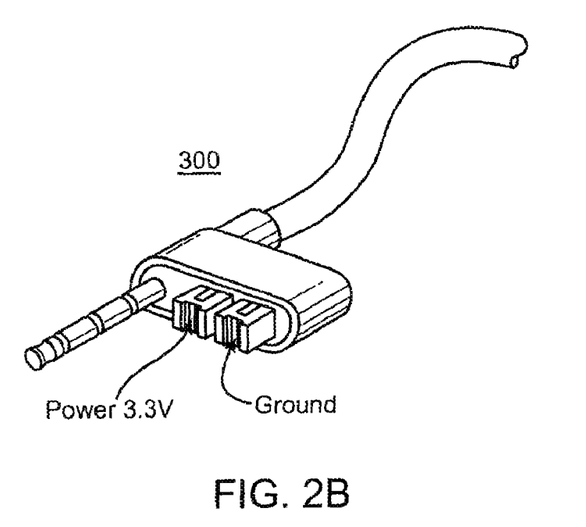
FIG. 2B illustrates a plug to be utilized in the remote connector.
Figure 2C:
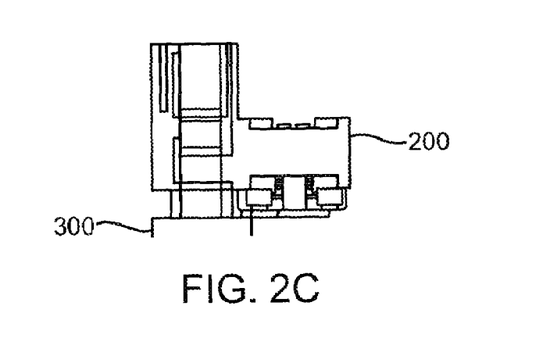
FIG. 2C illustrates the plug inserted into the remote connector.

The connection interface system also includes a remote connector which provides for the ability to output and input audio, and output video and which also provides I/O serial protocol. FIG. 2A is a front and top view of a remote connector 200 in accordance with the present invention. As is seen, the remote connector 200 includes a top headphone receptacle 202, as well as a second receptacle 204 for remote devices. FIG. 2B illustrates a plug 300 to be utilized in the remote connector. The plug 300 allows the functions to be provided via the remote connector. FIG. 2C illustrates the plug 300 inserted into the remote connector 200. Heretofore, all of these features have not been implemented in a remote connector. Therefore, a standard headphone cable can be plugged in, but also special remote control cables, microphone cables, and video cables could be utilized with the remote connector.

To describe the features of the connector interface system in more detail, please find below a functional description of the docking connector, remote connector and a command set in accordance with the present invention.

Docking and Remote Connector Specifications

Figure 3A:
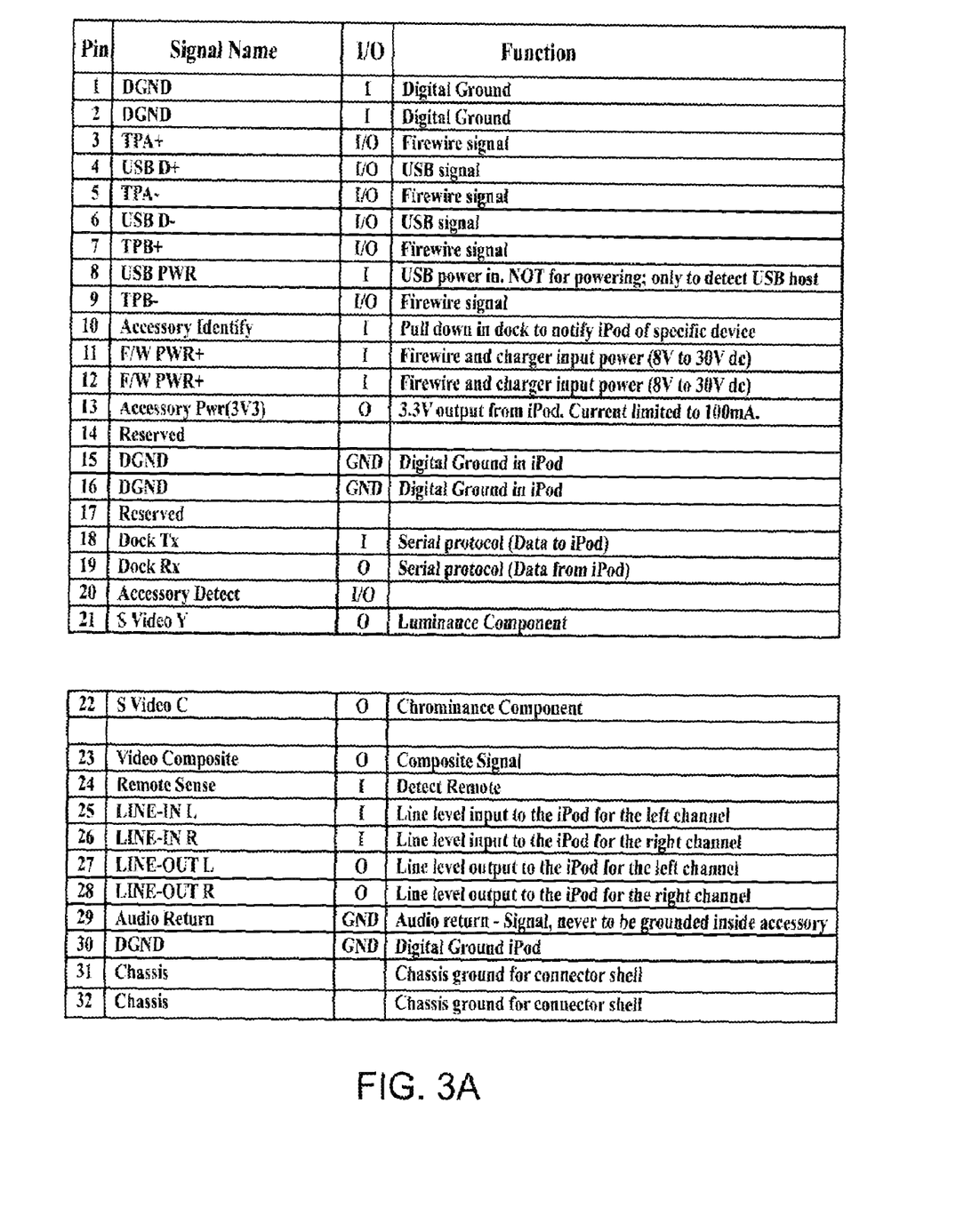
FIG. 3A illustrates the connector pin designations for the docking connector.
Figure 3B:
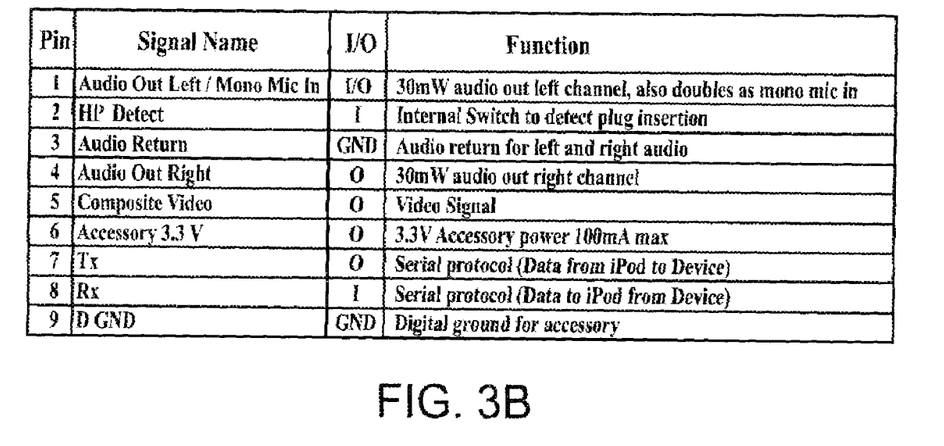
FIG. 3B illustrates the connection pin designations for the remote connector.

For an example of the connector pin designations for both the docking connector and for the remote connector for a media player such as an iPod device by Apple Computer, Inc., refer now to FIGS. 3A and 3B. FIG. 3A illustrates the connector pin designations for the docking connector. FIG. 3B illustrates the connection pin designations for the remote connector.

Docking Connector Specifications

Figure 4A:
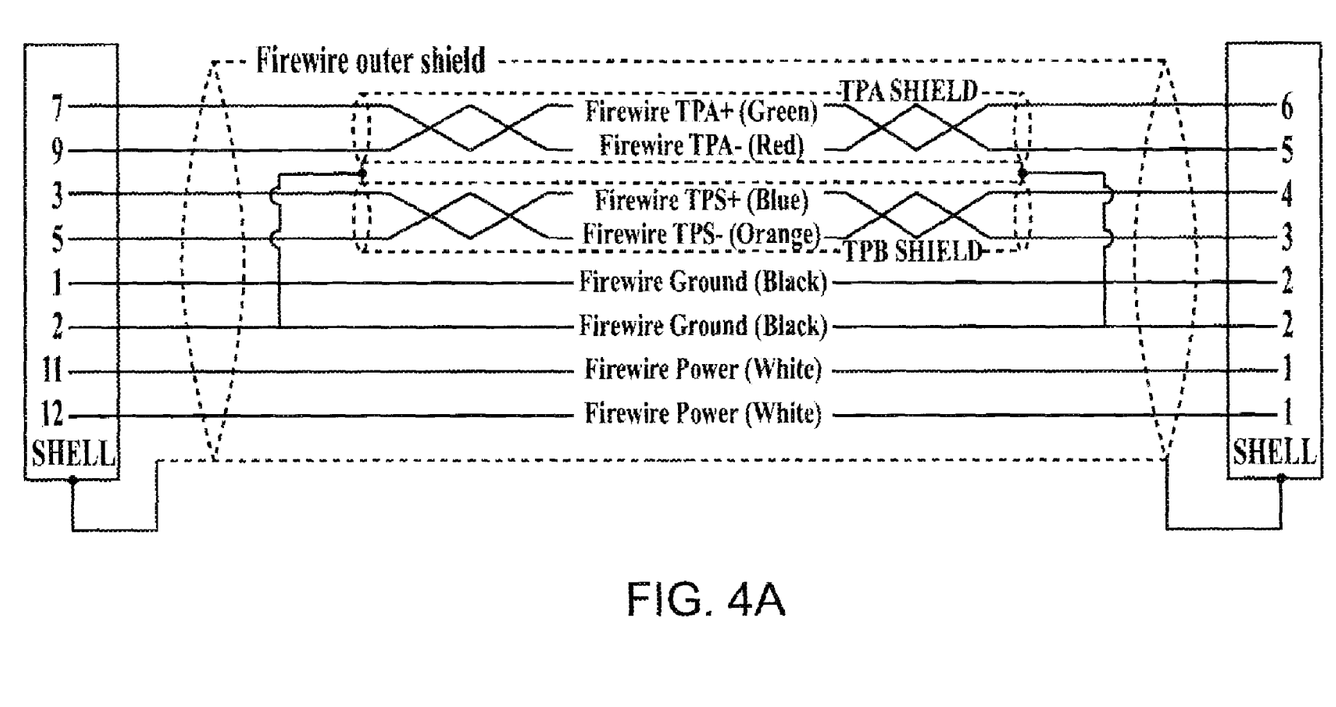
FIG. 4A illustrates a typical FireWire connector interface for the docking connector.

FIG. 4A illustrates a typical Firewire connector interface for the docking connector. The following are some exemplary specifications: Firewire power (8V-30V DC IN, 10W Max). In one embodiment, Firewire may be designed to the IEEE 1394 A Spec (400 Mb/s).

USB Interface

The media player provides two configurations, or modes, of USB device operation: mass storage and media player USB Interface (MPUI). The MPUI allows the media player to be controlled using a media player accessory protocol (MPAP) which will be described in detail later herein, using a USB Human Interface Device (HID) interface as a transport mechanism.

Accessory 3.3 V Power

Figure 4B:
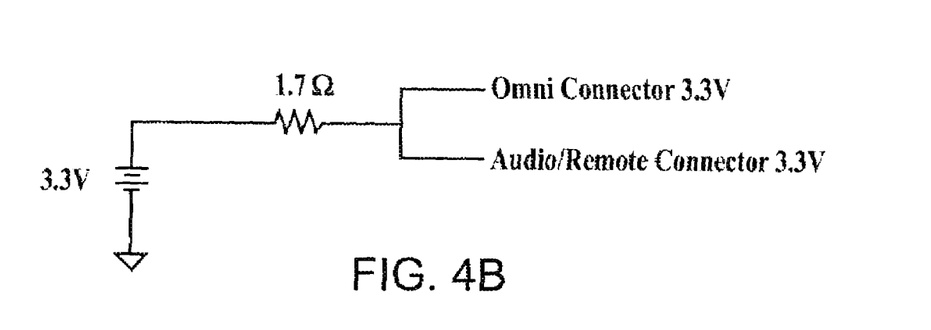
FIG. 4B illustrates a reference schematic diagram for an accessory power source.

FIG. 4B illustrates the accessory power source. The media player accessory power pin supplies voltages, for example, 3.0 V to 3.3V+/−5% (2.85 V to 3.465 V) over the 30-pin connector and remote connector (if present). A maximum current is shared between the 30-pin and Audio/Remote connectors.

By default, the media player supplies a particular current such as 5 mA. Proper software accessory detection is required to turn on high power (for example, up to 100 mA) during active device usage. When devices are inactive, they must consume less than a predetermined amount of power such as 5 mA current.

Accessory power is grounded through the Digital GND pins.

Figure 4C:
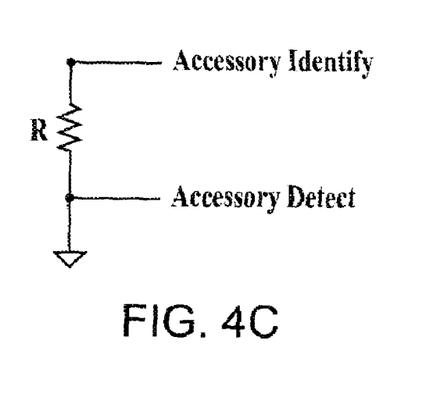
FIG. 4C illustrates a reference schematic diagram for a system for detecting and identifying accessories for the docking connector.

FIG. 4C illustrates a reference schematic diagram for a system for detecting and identifying accessories for the docking connector. The system comprises:

a) A resistor to ground allows the device to determine what has been plugged into docking connector. There is an internal pullup on Accessory Identify within the media player.

b) Two pins required (Accessory Identify & Accessory Detect)

Figure 4D:
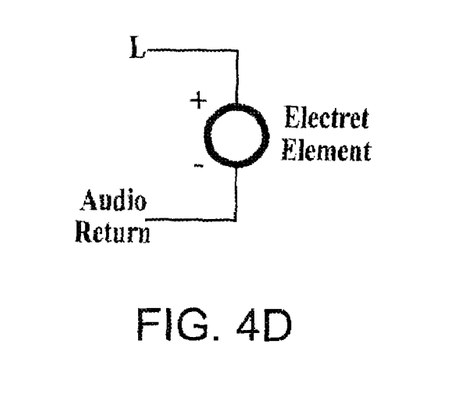
FIG. 4D is a reference schematic of an electret microphone that may be connected to the remote connector.

FIG. 4D is a reference schematic of an electret microphone that may be connected to the remote connector.

Serial Protocol Communication:

a) Two pins used to communicate to and from device (Rx & Tx)

b) Input & Output (0V=Low, 3.3V=High)

Figure 5A:
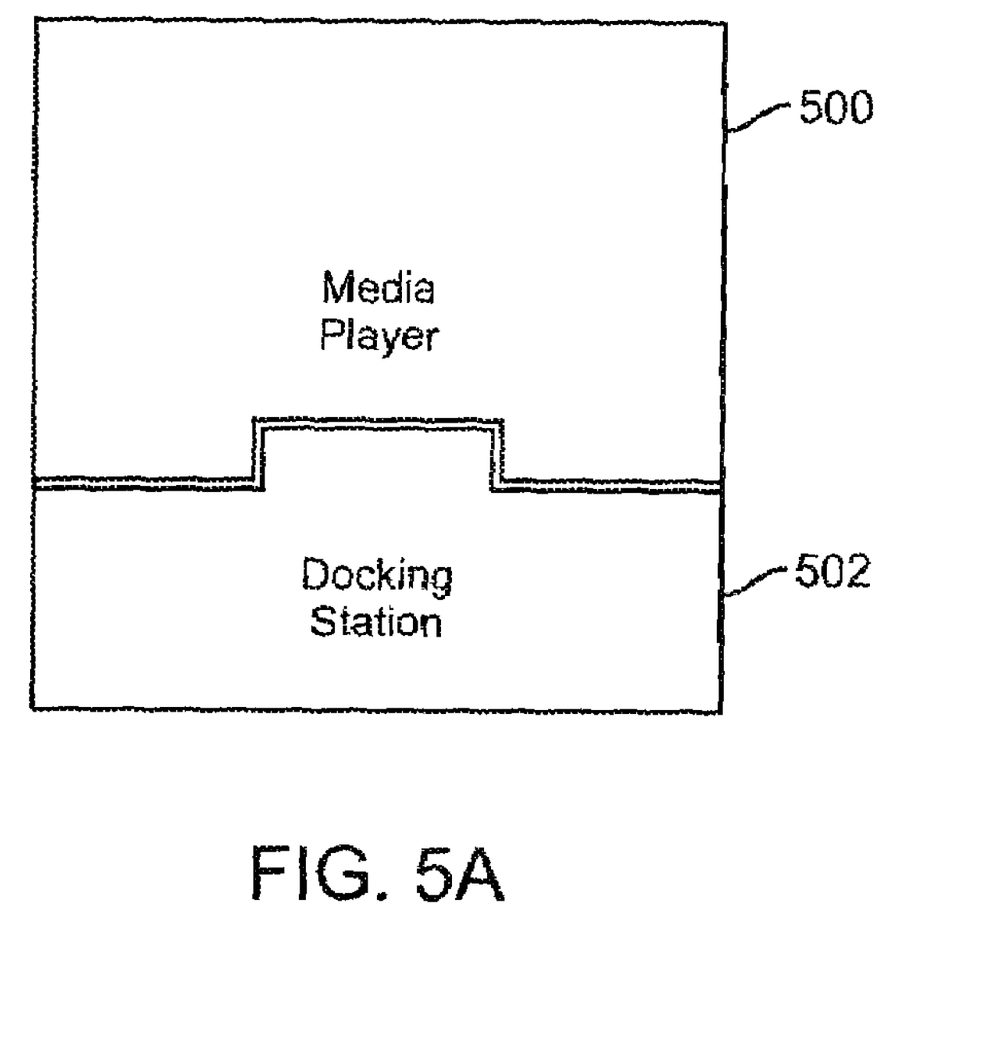
FIG. 5A illustrates a media player coupled to different accessories.
Figure 5B:
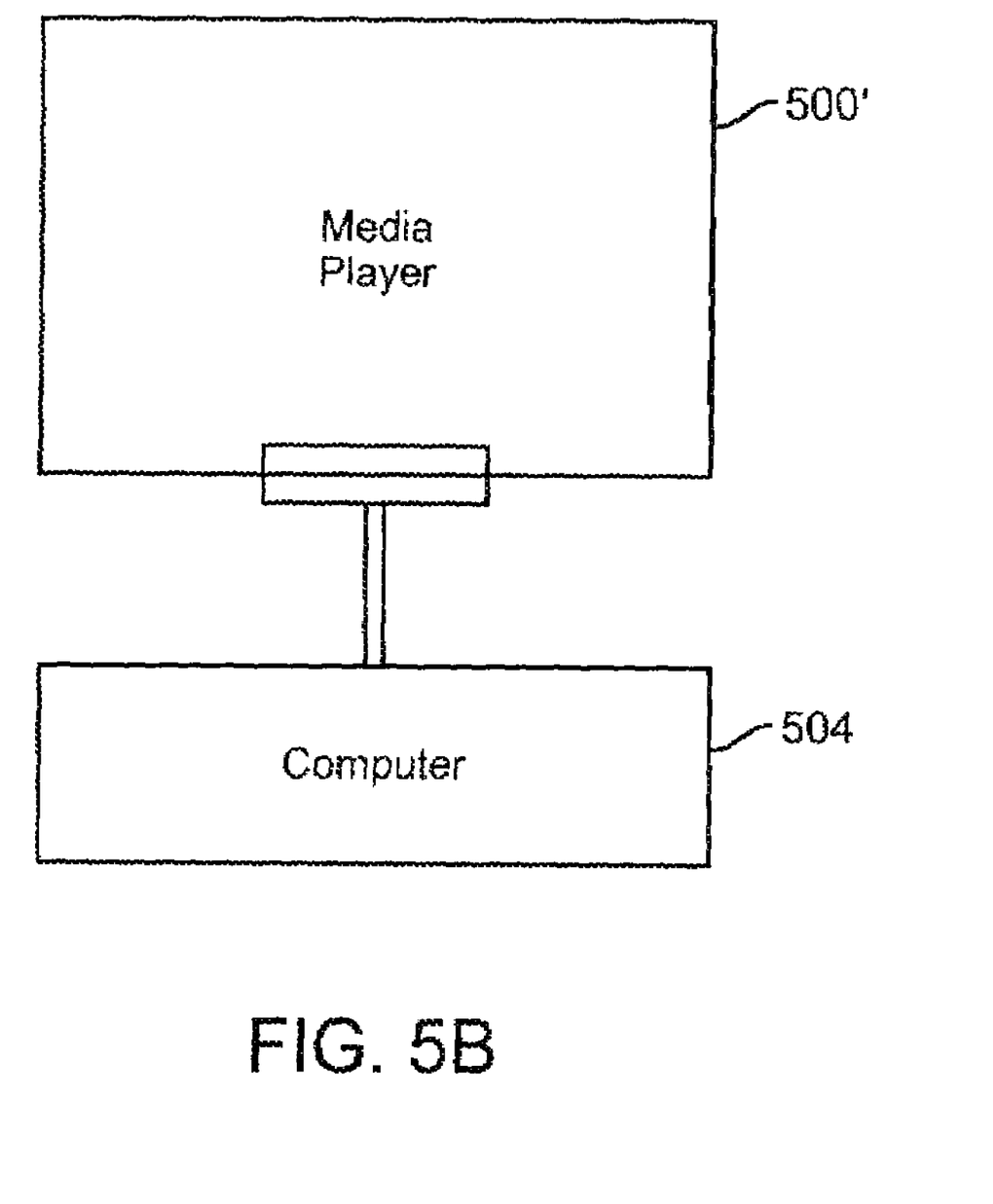
FIG. 5B illustrates the media player coupled to a computer.
Figure 5C:
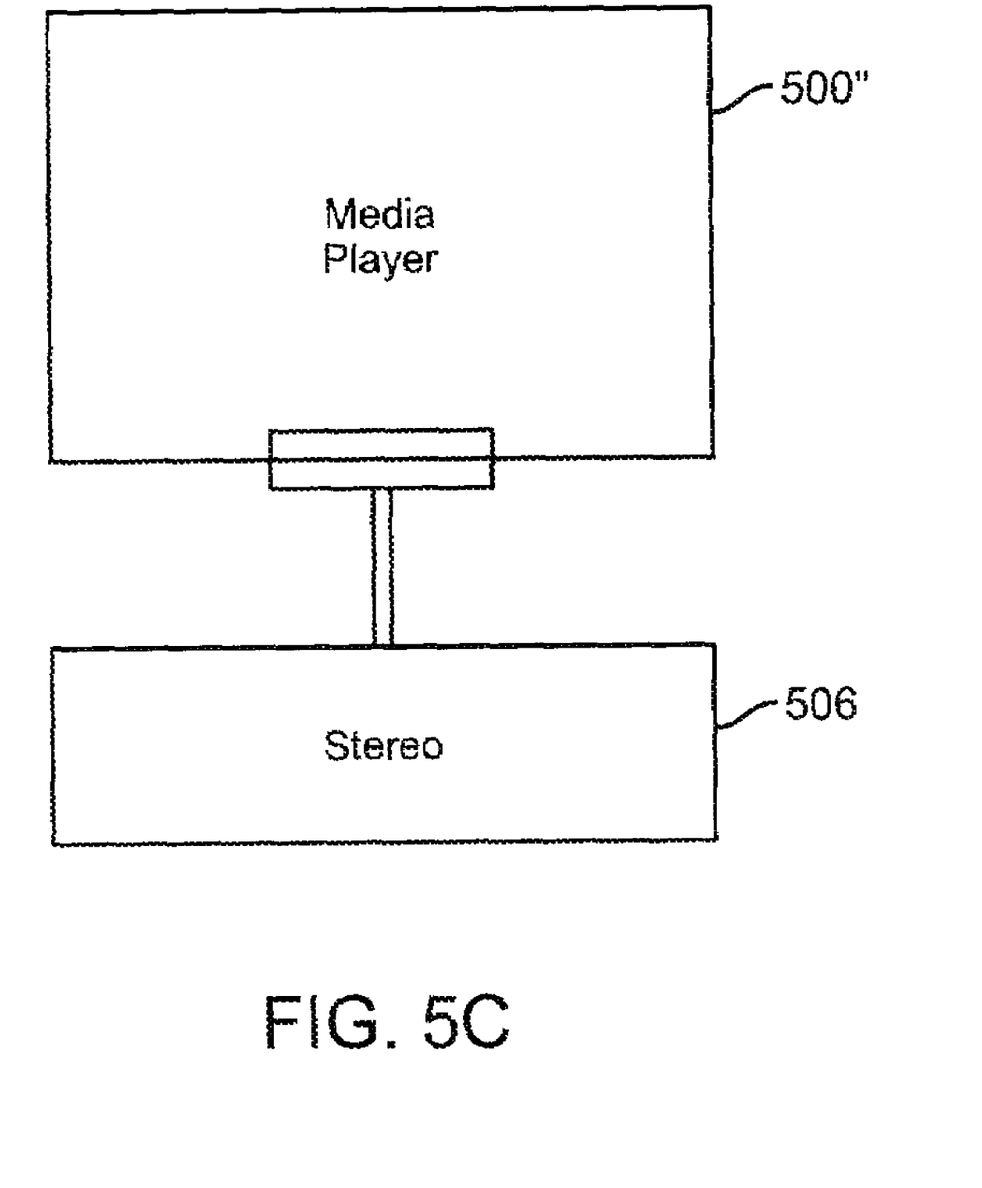
FIG. 5C illustrates the media player coupled to a car or home stereo system.
Figure 5D:
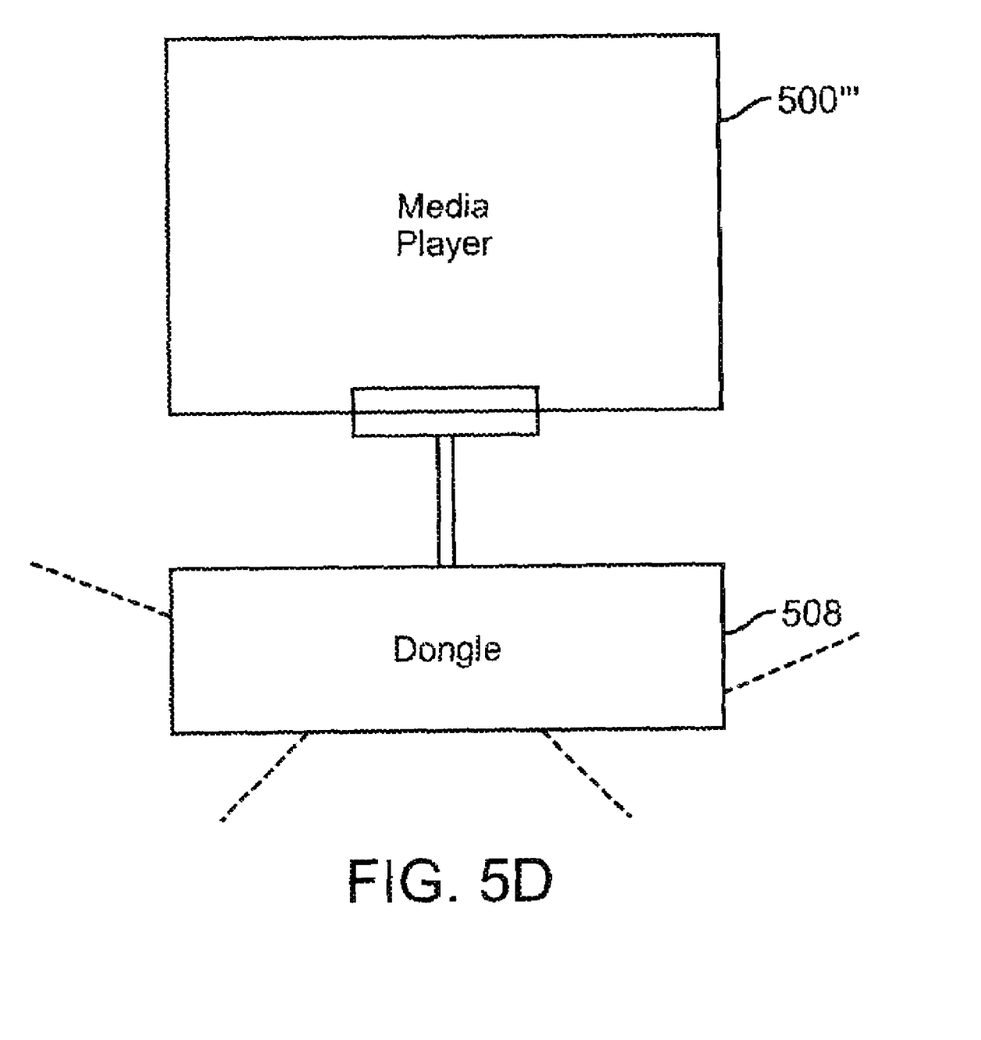
FIG. 5D illustrates the media player coupled to a dongle that communicates wirelessly with other accessories.
Figure 5E:
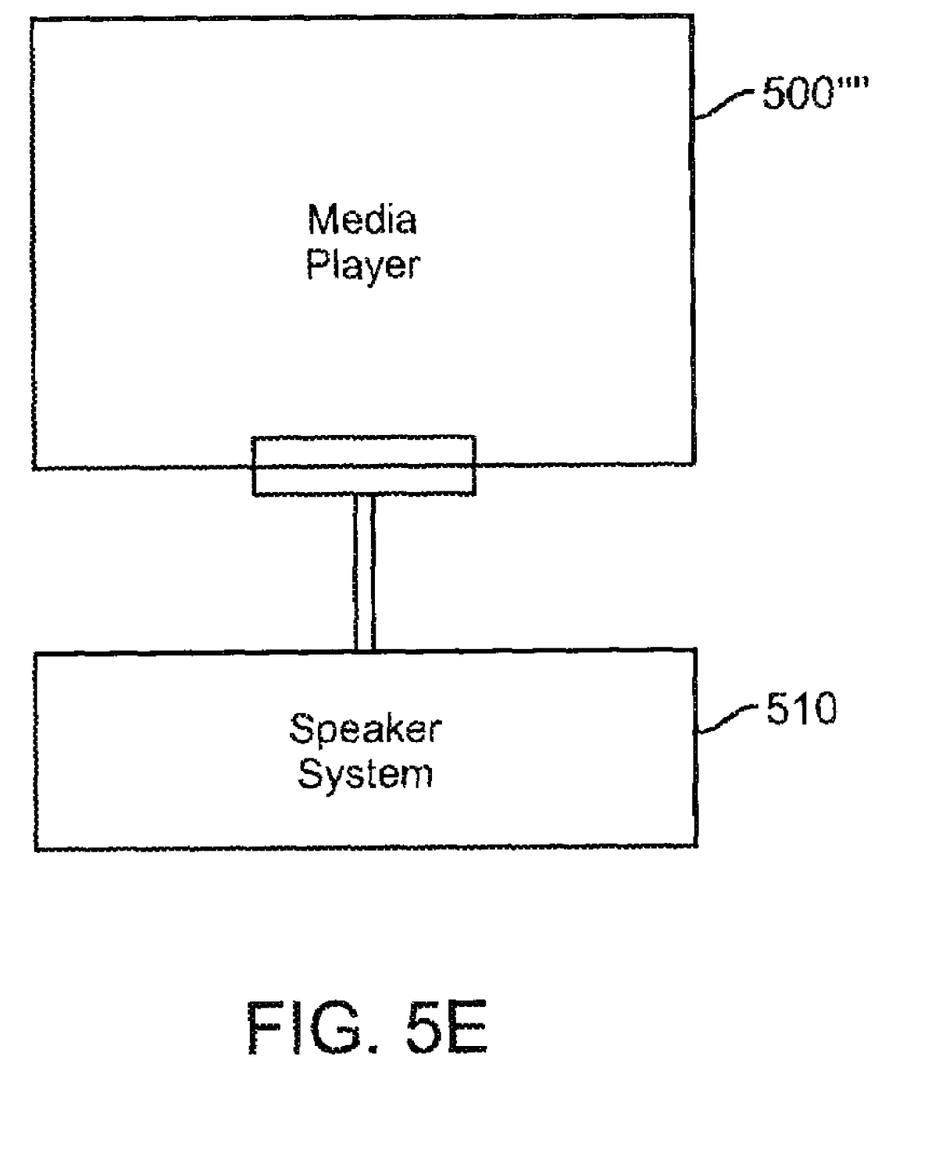
FIG. 5E illustrates the media player coupled to a speaker system.

As mentioned previously, media players connect to a variety of accessories. FIGS. 5A-5E illustrate a media player 500 coupled to different accessories. FIG. 5A illustrates a media player 500 coupled to a docking station 502. FIG. 5B illustrates the media player 500' coupled to a computer 504. FIG. 5C illustrates the media player 500" coupled to a car or home stereo system 506. FIG. 5D illustrates the media player 500''' coupled to a dongle 508 that communicates wirelessly with other devices. FIG. 5E illustrates the media player 500″″ coupled to a speaker system 510. As is seen, what is meant by accessories includes but is not limited to docking stations, chargers, car stereos, microphones, home stereos, computers, speakers, and accessories which communicate wirelessly with other accessories.

As mentioned previously, this connector interface system could be utilized with a command set for transferring status information between a media player and an accessory. In one embodiment, the accessory may be a host computer or any other electronic device or system that may communicate with the media player. It should be understood by one of ordinary skill in the art that although the above-identified connector interface system could be utilized with the command set, a variety of other connectors or systems could be utilized and they would be within the spirit and scope of the present invention. To describe the utilization of the command set in more detail refer now to the following description in conjunction with the accompanying Figure.

Power Conservation

Accessory device power management is important as media players transition to smaller physical sizes with the objective of extending battery life. Also, some accessories may draw power from the media player, and some accessories supply power to the media player. In one embodiment, as an accessory interacts with the media player, the media player may notify the accessory when the media player state changes (e.g., transitions to on/sleep/hibernate/off states, etc.). In one embodiment, accessory power will be in a low-power mode by default, and will be raised to a high-power mode during playback if the accessory requests intermittent high power. A power management policy may be applied for multi-function devices.

In one embodiment, an accessory is responsible for keeping its power consumption below a preset maximum allowed limit for each media player state. For example, as indicated above, the accessory power may be completely shut off when the media player enters hibernate and off states. Accordingly, in such states, an accessory that is powered by a media player will be unable to wake the media player. In one embodiment, if the media player is in a sleep state, the serial accessory should transmit any packets sent to the media player with a sync byte followed by a short delay before sending the packet. When waking from a sleep state, the accessory may be required to re-identify and re-authenticate itself (as with other devices using the device identification commands and/or authentication commands). Self-powered accessories should detect the presence of media player accessory power and initiate the identification process.

Remote Protocol

A remote protocol provides commands that enable the media player and an accessory to interact remotely. For example, as described in more detail below, in one embodiment, some commands enable the accessory to transmit button commands to the media player to manipulate the user interface (UI) of the media player. In one embodiment, the remote protocol transmits to the media player command packets, which contain one or more button status commands, and the media player interprets the button status commands based on a UI application context (e.g., media player UI application context).

Command Functionality

Although a plurality of commands is described hereinbelow, one of ordinary skill in the art recognizes that many other commands could be utilized and their use would be within the spirit and scope of the present invention. Accordingly, the list of commands below is representative, but not exhaustive, of the types of commands that could be utilized to transfer and store data between a media player and an accessory. Furthermore, it is also readily understood by one of ordinary skill in the art that a subset of these commands could be utilized by a media player or an accessory and that use would be within the spirit and scope of the present invention. A description of the functionality of some of these commands is described below.

Status Commands

Figure 6:
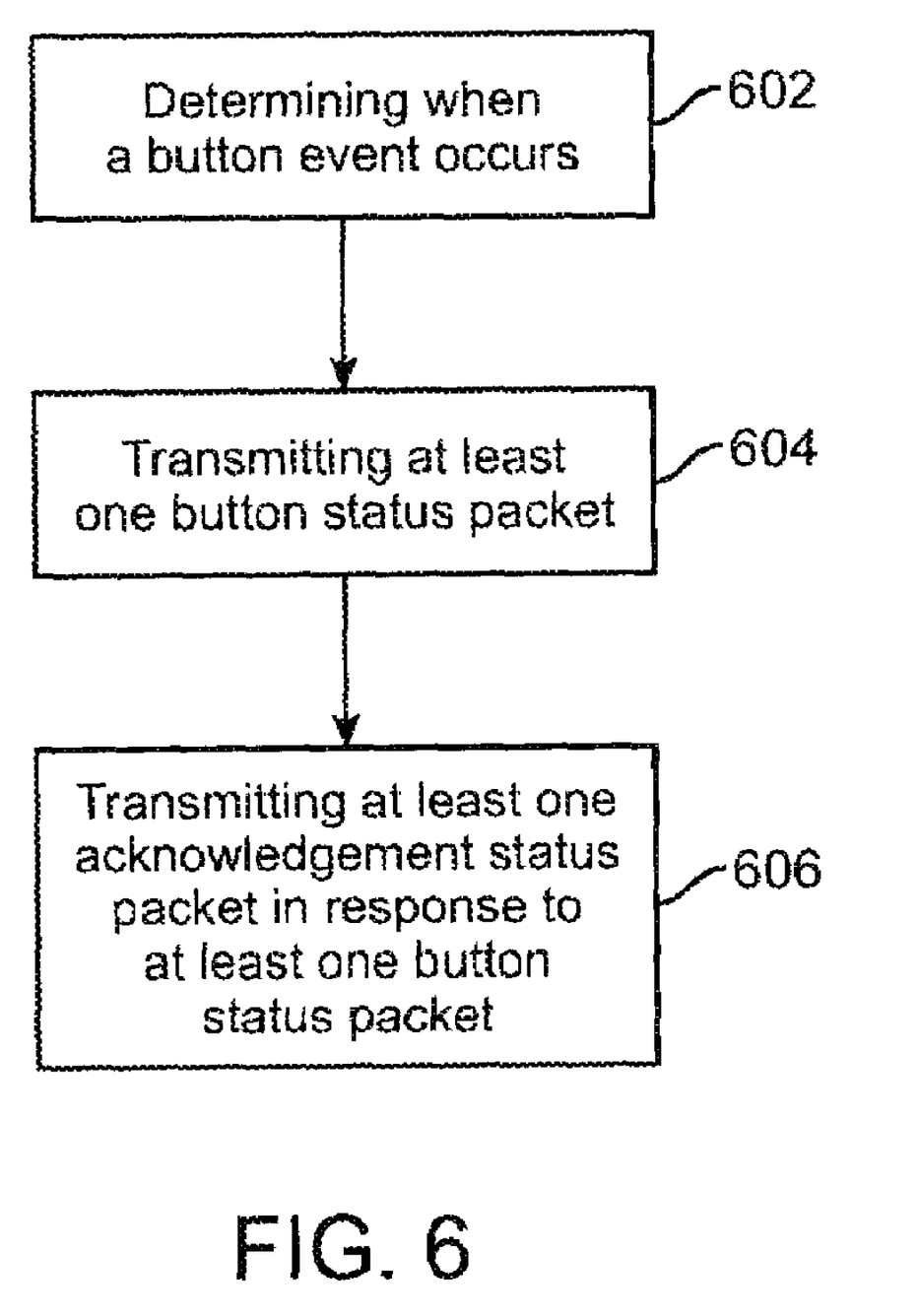
FIG. 6 is a flow chart, which illustrates a process for facilitating communication between a media player and an accessory.

FIG. 6 is a flow chart, which illustrates a process for facilitating communication between a media player and an accessory. As FIG. 6 illustrates, the process begins in step 602 where one of the media player and the accessory determines when a button event occurs. In one embodiment, a button event occurs when a user selects or presses a control button (e.g., on the accessory). In one embodiment, a command may be utilized to determine when a button event has occurred. Next, in step 604 one of the media player and the accessory transmits at least one button status command to the other of the media player and the accessory, wherein the one or more button status commands include one or more of context-specific button status commands, image button status commands, video commands, and audio button status commands. The transmission of the button status reports occurs when a button event occurs. A button status command includes a button status, which is a bitmask representing each button that is currently pressed. In one embodiment, button status commands are transmitted repeatedly to the media player at preset intervals (e.g., between 30-100 ms) while one or more buttons are pressed. When all buttons are released, the accessory transmits a button status command that indicates that no buttons are pressed.

As described in more detail below, there are dedicated button status commands for each media type (e.g. image/slideshow, video, audio, etc.). In one embodiment, media control button status bits may be organized such that the most frequently used buttons will be assigned low bit positions. This may reduce the button status command sizes for frequently used buttons. Button status commands provide media control commands that support not only basic buttons such as play/pause, volume up, volume down, next track, and previous track, but also support media control commands that support context specific buttons such as next album, previous album, down arrow, etc. In one embodiment, an accessory may query the remote protocol to determine which particular media control commands the media player supports.

Button status is maintained separately for all ports and all commands. As a result, buttons may be in different states for different media control types. In one embodiment, for a given port and media control type, if a command has not been received within a preset time period after the last button status command, the button status will be reset to an "all buttons up" state.

In some embodiments, some commands may require authentication. For example, context specific send button status commands may require authentication for USB ports. Media control commands require authentication and will therefore require use of a command for device identification (ID) with an authentication option enabled.

Acknowledge Status Command

Still referring to FIG. 6, in a step 606, one of the media player and the accessory transmits at least one acknowledgement status command to the other of the media player and the accessory in response to at least one button status command. In one embodiment, the media player may transmit an acknowledgement status command to the accessory in response to some, but not necessarily all, commands. The acknowledge status command includes an acknowledgement command that indicates a command status, which may include whether the command was received. The command status may also indicate whether the received command does not return any data, whether the received command includes a bad parameter, whether the received command is unsupported by the media player, and/or whether the received command is invalid.

In one embodiment, parameters for the acknowledgment command may include: Command OK, Command failed (valid command, did not succeed), Out of resources (media player internal allocation failed), Bad parameter (command or input parameters invalid), Command pending (cmdPendTime parameter returned), Not authenticated (not authenticated), Mismatched authentication protocol version, Command ID for which the response is being sent, etc.

In addition to the bitmask that indicates each button that is currently pressed, a status command that the accessory transmits to the media player may include various types of button status commands such as context-specific button status commands, image button status commands, video button status commands, and audio button status commands.

Context-Specific Button Status Command

The context-specific button status command is a command that is associated with particular functions. The accessory transmits a status command containing a context-specific button status command to the media player when a context-specific button event occurs. In one embodiment, parameters for a context-specific button status bitmask may include: PlayPause, VolumeUp, VolumeDown, NextTrack, PreviousTrack, NextAlbum, PreviousAlbum, Stop, Play/resume, Pause, MuteToggle, NextChapter, PreviousChapter, NextPlaylist, PreviousPlaylist, ShuffleSettingAdvance, RepeatSettingAdvance, PowerOn, PowerOff, BacklightFor30 Seconds, BeginFF, BeginRew, RemoteMenu, RemoteSelect, RemoteUpArrow, RemoteDownArrow, etc. In one embodiment, the media player may not return an acknowledgement packet to the device in response to this command.

Image Button Status Command

The image button status command is a command that is associated with image-based media (e.g., photos, slide shows, etc.). The accessory transmits a status command containing an image button status command to the media player when a image-specific button event occurs. In one embodiment, parameters for an image-specific button status bitmask may include: PlayPause, NextImage, PreviousImage, Stop, Play/resume, Pause, ShuffleAdvance, RepeatAdvance, etc. In one embodiment, in response to the image button status command, the media player will return an acknowledgement status command to the accessory with the command status.

Video Button Status Command

The video button status command is a command that is associated with video media (e.g., movies, television shows, etc.). The accessory transmits a status command containing a video button status command to the media player when a video-specific button event occurs. In one embodiment, parameters for a video-specific button status bitmask may include: PlayPause, NextVideo, PreviousVideo, Stop, Play/resume, Pause, BeginFF, BeginREW, Next chapter, Previous chapter, Next frame, Previous frame, Caption advance, etc.

In one embodiment, in response to the video button status command, the media player will return an acknowledgement status command to the accessory with the command status.

Audio Button Status Command

The audio button status command is a command that is associated with audio media (e.g., music, audiobooks, podcasts, etc.). The accessory transmits a status command containing an audio button status command to the media player when an audio-specific button event occurs. In one embodiment, parameters for an audio-specific button status bitmask may include: PlayPause, VolumeUp, VolumeDown, NextTrack, PreviousTrack, NextAlbum, PreviousAlbum, Stop, Play/resume, Pause, MuteToggle, NextChapter, PreviousChapter, NextPlaylist, PreviousPlaylist, ShuffleSettingAdvance, RepeatSettingAdvance, BeginFF, BeginRew, Record, etc. In one embodiment, in response to the audio button status command, the media player will return an acknowledgement status command to the accessory with the command status.

A method and system in accordance with the present invention, media players and accessories are able to exchange status information using status commands has been disclosed. In one embodiment, when the accessory determines that a button event occurs, the accessory transmits at least one button status command to the media player. The media player may then transmit at least one acknowledgement status command to the accessory in response to the button status command.

Although the present invention has been described in accordance with the embodiments shown, one of ordinary skill in the art will readily recognize that there could be variations to the embodiments and those variations would be within the spirit and scope of the present invention. For example, the present invention can be implemented using hardware, software, a computer readable medium containing program instructions, or a combination thereof. Software written according to the present invention is to be either stored in some form of computer-readable medium such as memory or CD-ROM, or is to be transmitted over a network, and is to be executed by a processor. Consequently, a computer readable medium is intended to include a computer readable signal, which may be, for example, transmitted over a network. Accordingly, many modifications may be made by one of ordinary skill in the art without departing from the spirit and scope of the appended claims.

What is claimed is:

1. A method for transferring status information between a media player and an accessory, the method comprising:

determining, by the accessory, when a button event occurs; and transmitting, by the accessory, at least one button status command to the media player, wherein the one or more button status commands comprise a context-specific button status command and at least one command associated with a particular media type, wherein the button status commands comprise button status bits that are organized such that the most frequently used buttons are assigned low bit positions to reduce the overall button status data transfer size.

2. The method of claim 1 further comprising transmitting, by the media player, at least one acknowledgement status command to the accessory in response to the at least one button status command.

3. The method of claim 1 wherein the one or more button status commands support different media types.

4. The method of claim 3 wherein the media types include one or more of image, video, or audio.

5. The method of claim 1 wherein the button status commands support a plurality of buttons including at least play/pause, volume up, volume down, next track, and previous track.

6. The method of claim 1 wherein the button status commands support a plurality of context-specific buttons including at least next album, previous album, and down arrow.

7. A protocol for transferring status information between a media player and an accessory, the protocol comprising:
at least one command for determining, by the accessory, when a button event occurs; and
a plurality of commands for transmitting, by the accessory, at least one button status command to the media player, wherein the one or more button status commands comprise a context-specific button status command and at least one command associated with a particular media type,
wherein the button status commands comprise button status bits that are organized such that the most frequently used buttons are assigned low bit positions.

8. The protocol of claim 7 wherein the plurality of commands comprises a command for transmitting, by the media player, at least one acknowledgement status command to the accessory in response to the at least one button status command.

9. The protocol of claim 7 wherein the one or more button status commands support different media types.

10. The protocol of claim 7 wherein the button status commands support a plurality of buttons including at least play/pause, volume up, volume down, next track, and previous track.

11. The protocol of claim 7 wherein the button status commands support a plurality of context-specific buttons including at least next album, previous album, and down arrow.

12. The protocol of claim 9 wherein the media types include one or more of image, video, or audio.

13. A portable device comprising:
a media player;
an interface coupled to the media player; and
a command set in communication with the interface, wherein the command set enables the media player and an accessory to transfer status information therebetween, the command set comprising:
at least one command for determining, by the accessory, when a button event occurs; and
a plurality of commands for transmitting, by the accessory, at least one button status command to the media player, wherein the one or more button status commands comprise a context-specific button status command and at least one command associated with a particular media type,
wherein the button status commands comprise button status bits that are organized such that the most frequently used buttons are assigned low bit positions.

14. The media player of claim 13 wherein the plurality of commands comprises a command for transmitting, by the media player, at least one acknowledgement status command to the accessory in response to the at least one button status command.

15. The media player of claim 13 wherein the one or more button status commands support different media types.

16. The media player of claim 13 wherein the button status commands support a plurality of buttons including at least play/pause, volume up, volume down, next track, and previous track.

17. The media player of claim 13 wherein the button status commands support a plurality of context-specific buttons including at least next album, previous album, and down arrow.

18. The media player of claim 15 wherein the media types include one or more of image, video, or audio.

19. An accessory comprising:
a device for transferring data;
an interface coupled to the device; and
a command set in communication with the interface, wherein the command set enables the media player and an accessory to transfer status information therebetween, the command set comprising:
at least one command for determining, by the accessory, when a button event occurs; and
a plurality of commands for transmitting, by the accessory, at least one button status command to the media player, wherein the one or more button status commands comprise a context-specific button status command and at least one command associated with a particular media type,
wherein the button status commands comprise button status bits that are organized such that the most frequently used buttons are assigned low bit positions.

20. The accessory of claim 19 wherein the plurality of commands comprises a command for transmitting, by the media player, at least one acknowledgement status command to the accessory in response to the at least one button status command.

21. The accessory of claim 19 wherein the one or more button status commands support different media types.

22. The accessory of claim 19 wherein the button status commands support a plurality of buttons including at least play/pause, volume up, volume down, next track, and previous track.

23. The accessory of claim 19 wherein the button status commands support a plurality of context-specific buttons including at least next album, previous album, and down arrow.

24. The accessory of claim 21 wherein the media types include one or more of image, video, or audio.

25. A computer-readable medium containing program instructions for transferring status information between a media player and an accessory, the program instructions which when executed by a computer system cause the computer system to execute a method comprising:
determining, by the accessory, when a button event occurs; and
transmitting, by the accessory, at least one button status command to the media player, wherein the one or more button status commands comprise a context-specific button status command and at least one command associated with a particular media type,
wherein the button status commands comprise button status bits that are organized such that the most frequently used buttons are assigned low bit positions.

26. The computer-readable medium of claim 25 further comprising program instructions for transmitting, by the media player, at least one acknowledgement status command to the accessory in response to the at least one button status command.

27. The computer-readable medium of claim 25 wherein the one or more button status commands support different media types.

28. The computer-readable medium of claim 25 wherein the media types include one or more of image, video, or audio.

29. The computer-readable medium of claim 25 wherein the button status commands support a plurality of buttons including at least play/pause, volume up, volume down, next track, and previous track.

30. The computer-readable medium of claim 25 wherein the button status commands support a plurality of context-specific buttons such as next album, previous album, and down arrow.

* * * * *

UNITED STATES PATENT AND TRADEMARK OFFICE
CERTIFICATE OF CORRECTION

| | | |
|---|---|---|
| PATENT NO. | : 7,305,506 B1 | Page 1 of 1 |
| APPLICATION NO. | : 11/476262 | |
| DATED | : December 4, 2007 | |
| INVENTOR(S) | : Gregory T. Lydon et al. | |

It is certified that error appears in the above-identified patent and that said Letters Patent is hereby corrected as shown below:

On the face page, in field (57), under "Abstract", in column 2, line 11, delete "environment" and insert -- environments --, therefor.

In column 3, line 54, after "video" insert -- , --.

Signed and Sealed this

Tenth Day of August, 2010

David J. Kappos
*Director of the United States Patent and Trademark Office*